Patented Mar. 24, 1936

2,034,895

UNITED STATES PATENT OFFICE 2,034,895

MOLDING COMPOSITIONS

William S. Calcott, Pennsgrove, N. J., and Harry Howard Reynolds, Wilmington, Del., assignors to E. I. du Pont de Nemours & Company, Wilmington, Del., a corporation of Delaware No Drawing. Application March 2, 1929, Serial No. 344,094

1 Claim. (Cl. 18—55)

This invention relates to new molding compositions and more particularly to molding compositions containing as a constituent a liquid, polymerizable, non-volatile polymer of acetylene.

Molding compositions have been made for many years and several different types of molding compositions are in use at the present time. They ordinarily consist of a solid or semi-solid binder of some sort, together with fillers. Many different kinds of fillers have been used, such for example as asbestos, clay, mica, silica cement, magnesia, vegetable fibers such as cotton or wood pulp, etc. The binders have also been of various types, such for example as asphalt, pitch, gums, etc., perhaps mixed with fillers in the presence of a solvent for the binder, or the phenol-formaldehyde resins which are mixed with the fillers in the form of a powder, which melts on heating but which on longer heating changes to an infusible material, thus producing a hard infusible molded composition.

An object of the present invention is to eliminate the necessity of melting or dissolving the binder by the production from a normally liquid material of a molded article that will be insoluble in all known solvents, and that will be non-volatile, non-thermoplastic, chemically inert and especially resistant to water and transformer oil.

With these objects in view applicants have discovered that when the liquid polymerizable polymers of acetylene are mixed with a suitable filler such as described above and preferably a small quantity of an antioxidant, such as phenyl-a-naphthylamine, the resulting mixture may be successfully used as a molding composition. When such a mixture is placed in a mold and subjected to heat and pressure, it yields a smooth, compact, and homogeneous article.

The method of producing the viscous liquid polymerizable acetylene polymers to be employed in the molding composition is not a part of the present invention but is the subject of separate patents of Nieuwland No. 1,811,959 and No. 1,812,541 and of Collins No. 1,812,849, and an application of Calcott and Downing, Serial No. 288,528, filed June 26, 1928. It may be stated here, however, that these polymers may be prepared from the hydrocarbon mixture obtained by passing acetylene into a mixture of 945 parts of ammonium chloride, 1000 parts of water, 2850 parts of cuprous chloride and 100 parts of copper powder, and distilling off and collecting the resulting unsaturated hydrocarbons. The water driven over during the distillation process may be returned to the catalyst mixture which is then ready for retreatment with acetylene. The major product of the distillate so obtained is a low boiling (80 to 85° C.), highly unsaturated oil called divinyl acetylene and having the empirical formula $C_6H_6$. Small amounts of higher and lower boiling unsaturated oils are also obtained which result from the polymerization or further reaction of the low boiling product. Among these unsaturated oils may be mentioned a polymer having the empirical formula $C_8H_8$ and, therefore, a tetramer of acetylene, and a polymer having the formula $C_4H_4$.

The hydrocarbon or hydrocarbon mixture thus obtained, which for purposes of convenience will be designated hereafter as divinyl acetylene, is a volatile liquid, polymerizing very rapidly under exposure to air to a viscous liquid and subsequently to a gelatinous or resinous solid.

It is the viscous liquid formed during the first stages of the polymerization of the divinyl acetylene that is the product employed in the preparation of the herein described molding composition. As disclosed in the patents and application cited above, the polymerization of the divinyl acetylene to a viscous liquid may be accelerated by heating in air to temperatures below 100° C. and is more readily controlled when heated in the presence of an inert atmosphere as nitrogen. In preparing the liquid to be employed in the molding operation, which is the subject of the present invention, the divinyl acetylene is preferably heated in an atmosphere of nitrogen for approximately seven hours at temperatures between 80° and 100° C. The more volatile impurities, as unchanged divinyl acetylene, are thereafter preferably removed by distillation at temperatures below 100° C. and under reduced pressure leaving the non-volatile oily liquid desired.

Further as appears from the application cited above, the polymerization can be held in check by the exclusion of air or by the use of antioxidants, those suitable for rubber, for instance, hydroquinone, acet-aldehyde aniline and phenyl alpha naphthylamine, being also suitable for use here. The stabilization by means of antioxidants, however, is not essential and forms no inherent part of this invention, but is the subject of separate patent applications.

A viscous liquid prepared according to any of the processes described above is suitable for use in the present invention. It is to be understood, moreover, that it is not applicants' intention to be limited to any particular method of obtaining the viscous polymers and that the present invention contemplates the employment of the viscous non-benzenoid liquid polymerizable polymers of acetylene hereinabove described however obtained and whether obtained by standing in air, heating in the presence of air or heating in the presence of an inert atmosphere. In preparing the polymer, the duration of the polymerization treatment may also obviously be varied to suit not only the particular condition of polymerization but the degree of polymerization and viscosity desired. The term "liquid polymerizable polymer of acetylene" is therefore used hereinafter to generically indicate non-benzenoid viscous oily like products obtained from acetylene and of the type hereinabove described.

In order to set forth the invention in detail the following examples of actual embodiments thereof are furnished for purposes of illustration:

Example I

A mixture containing 25 percent of the polymers by weight, 74% wood flour, and 1% phenyl-a-naphthylamine was placed in a mold and subjected to a temperature of 160° C. and a pressure of 2000 lbs. per square inch. In 40 minutes the article was found to be satisfactorily cured.

Example II

A mixture containing 50% of the polymers by weight, 49% wood flour, and 1% phenyl-a-naphthylamine was placed in a mold and subjected to a temperature of 140° C. and a pressure of 6500 lbs. per square inch. A period of 1 hour was required for curing this mixture.

It will be understood that the temperature and pressure at which curing is effective may be varied through a comparatively wide range, provided the duration of the curing is correspondingly increased as the temperature or pressure is decreased. For example, at 160° C. an article will cure in 40 minutes, whereas at 100° C. and under the same pressure several hours are required. The preferred temperature range lies between 100° C. and 160° C.

The proportions of the polymers and wood flour obviously may also be varied, with corresponding changes taking place in both the appearance and properties of the molded article. Moreover, a number of different fillers may be successfully employed, such, for example, as pyrites, asbestos, clay, carbon black, and gypsum. In fact, any of the various fillers heretofore employed in similar compositions is adapted for use here.

The resulting compositions possess certain definite and important advantages over the prior products of this art. Notably, these advantages are complete insolubility of the molded compound in all known solvents, non-volatility, non-thermoplasticity, chemical inertness, and especially high resistance to water and transformer oil.

As many apparently widely different embodiments of this invention may be made without departing from the spirit thereof, it is to be understood that we do not limit ourselves to the foregoing examples or descriptions except as indicated in the following patent claim.

We claim:

A composition of matter prepared by subjecting a mixture containing 25% by weight of a liquid non-benzenoid polymerizable polymer of acetylene which is non-volatile at 100° C., 1% phenyl-a-naphthylamine and 74% of wood flour, to a temperature of substantially 160° C. and a pressure of substantially 2000 lbs. per square inch for 40 minutes, said composition being characterized by its insolubility, non-volatility, non-thermo-plasticity, inertness to chemicals and an especially high resistance to water and transformer oil.

WILLIAM S. CALCOTT.
HARRY HOWARD REYNOLDS.